United States Patent
Fan et al.

(10) Patent No.: US 9,207,391 B2
(45) Date of Patent: Dec. 8, 2015

(54) BACKLIGHT MODULE AND LIQUID CRYSTAL DISPLAY

(71) Applicant: Shenzhen China Star Optoelectronics Technology Co., Ltd., Shenzhen, Guangdong (CN)

(72) Inventors: Yong Fan, Shenzhen (CN); Chong Xiong, Shenzhen (CN)

(73) Assignee: Shenzhen China Star Optoelectronics Technology Co., Ltd, Shenzhen, Guangdong ( * ) Notice: Subject to any disclaimer, the term of this patent is extended or adjusted under 35 U.S.C. 154(b) by 132 days.

(21) Appl. No.: 14/005,549

(22) PCT Filed: Aug. 9, 2013

(86) PCT No.: PCT/CN2013/081133
§ 371 (c)(1),
(2) Date: Sep. 16, 2013

(87) PCT Pub. No.: WO2015/013992
PCT Pub. Date: Feb. 5, 2015

(65) Prior Publication Data
US 2015/0036076 A1     Feb. 5, 2015

(30) Foreign Application Priority Data

Jul. 30, 2013 (CN) .......................... 2013 1 0325554

(51) Int. Cl.
*G02F 1/1335* (2006.01)
*F21V 8/00* (2006.01)
*F21V 5/04* (2006.01)

(52) U.S. Cl.
CPC .............. *G02B 6/0078* (2013.01); *F21V 5/046* (2013.01); *G02B 6/0051* (2013.01); *G02F 1/133606* (2013.01)

(58) Field of Classification Search
CPC .................... G02F 1/133615; G02F 1/133606; G02B 6/0078; F21V 5/0046
USPC .............. 349/64, 65, 62; 362/311.06, 311.02, 362/612
See application file for complete search history.

(56) References Cited

U.S. PATENT DOCUMENTS

| | | | |
|---|---|---|---|
| 2002/0024803 A1* | 2/2002 | Adachi et al. | 362/31 |
| 2010/0002169 A1* | 1/2010 | Kuramitsu et al. | 349/65 |
| 2010/0201911 A1* | 8/2010 | Iiyama et al. | 349/61 |

FOREIGN PATENT DOCUMENTS

| | | |
|---|---|---|
| CN | 101603665A A | 12/2009 |
| CN | 202757018U U | 2/2013 |

*Primary Examiner* — Thanh-Nhan P Nguyen
(74) *Attorney, Agent, or Firm* — Andrew C. Cheng

(57) ABSTRACT

The invention discloses a backlight module and liquid crystal display device. The backlight module of liquid crystal display device includes: a back plate and a diffuser disposed opposite to back plate; backlight module further comprising a plurality of light-emitting units, disposed between back plate and diffuser; each of light-emitting units comprising a light-guiding strip, fixed to back plate and light source, fixed and disposed on back plate opposite to one end of light-guiding strip; wherein light-guiding strip comprising a light-emitting surface and a bottom surface, disposed oppositely to each other; light-emitting surface having an arc cross-section and a top being convex facing bottom surface; light-emitting surface being for uniformly diffusing incident light from light source. Through disposing light-guiding strips for diffusing incident light from light source, the invention can achieve higher luminance with less number of light sources and reduce cost.

16 Claims, 3 Drawing Sheets

BACKLIGHT MODULE AND LIQUID CRYSTAL DISPLAY

BACKGROUND OF THE INVENTION

1. Field of the Invention

The present invention relates to the field of liquid crystal displaying techniques, and in particular to a backlight module and liquid crystal display device.

2. The Related Arts

The liquid crystal display device (LCD) is widely applied to various electronic devices, such as, computers, mobile phones, electronic dictionary and liquid crystal television because of the advantages of thin, light-weight, low energy-consumption and low radiation. In general, a liquid crystal display device mainly comprises a backlight module, a liquid crystal display panel, and a driving circuit wherein the backlight module is categorized as a direct-type back light module or an edge-type backlight module.

The light sources in the direct-type backlight module is arranged on the back plate in a matrix format, while the light sources in the edge-type backlight module is arranged on the side of the back plate and the light emitted by the light sources passes a light-guiding plate to obtain a planar light source. In the direct-type backlight module, the number of the light sources must be sufficient to achieve better luminance uniformity, In the edge-type backlight module, even though the number of light sources is lower, a light-guiding plate is required to uniformly diffuse the light emitted by the light sources to achieve better luminance uniformity. The high number of light sources of direct-type backlight module and the light-guiding plate in the light sources of edge-type backlight module both increase the cost of the backlight module.

SUMMARY OF THE INVENTION

To address the above issues in known technologies, the present invention provides a backlight module and a liquid crystal display device, able to increase the luminance and uniformity of the luminance of the backlight module as well as reduce the cost of the backlight module.

The present invention provides a backlight module, which comprises a back plate and a diffuser disposed opposite to the back plate; the backlight module further comprising a plurality of light-emitting units, disposed between the back plate and the diffuser; each of the light-emitting units comprising a light-guiding strip, fixed to the back plate and light source, fixed and disposed on the back plate opposite to one end of the light-guiding strip; wherein the light-guiding strip comprising a light-emitting surface and a bottom surface, disposed oppositely to each other; the light-emitting surface having an arc cross-section and a top being convex facing the bottom surface; the light-emitting surface being for uniformly diffusing incident light from the light source.

The present invention also provides a liquid crystal display device, which comprises: a backlight module and a liquid crystal display panel disposed opposite to each other, the backlight module providing displaying light source to the liquid crystal display panel for displaying images, wherein the backlight module further comprising: a back plate and a diffuser disposed opposite to the back plate; the backlight module further comprising a plurality of light-emitting units, disposed between the back plate and the diffuser; each of the light-emitting units comprising a light-guiding strip, fixed to the back plate and light source, fixed and disposed on the back plate opposite to one end of the light-guiding strip; wherein the light-guiding strip comprising a light-emitting surface and a bottom surface, disposed oppositely to each other; the light-emitting surface having an arc cross-section and a top being convex facing the bottom surface; the light-emitting surface being for uniformly diffusing incident light from the light source.

According to a preferred embodiment of the present invention, the cross-section of the light-guiding strip is symmetrical respect to the perpendicular bisector of the bottom edge, wherein in the cross-section of the light-guiding strip, a first segment is a straight line and perpendicular to the bottom edge, a second segment, a third segment and a fourth segment are smooth arcs; the second segment is centered at the intersection point of a bottom edge and a line passing the intersection of the second segment and the third segment and perpendicular to the bottom edge; the second segment is convex facing away from the bottom edge; the fourth segment is centered at the intersection of bottom edge and the perpendicular bisector and the fourth segment is concave facing the bottom edge; the third segment is centered at the intersection of a line comprising the intersection of the third segment and the fourth segment and the center of the fourth segment, and a line comprising the intersection of the second segment and the third segment and perpendicular to the bottom edge, and the third segment is convex facing away the bottom edge.

According to a preferred embodiment of the present invention, a plurality of mesh dots is disposed at the bottom surface of the light-guiding strip opposite to the back plate; the mesh dots are for changing the direction of incident light; the mesh dots are distributed starting along the end of the light-guiding strip opposite to the light source and the density gradually increases towards the other end of the light-guiding strip away from the light source.

According to a preferred embodiment of the present invention, positioning holes are disposed at the bottom surface of the light-guiding strip opposite to the back plate; positioning pegs are disposed on the back plate correspondingly; the positioning pegs are inserted into the corresponding positioning holes to fix the light-guiding strip.

According to a preferred embodiment of the present invention, positioning pegs are disposed at the bottom surface of the light-guiding strip opposite to the back plate; positioning holes are disposed on the back plate correspondingly; the positioning pegs are inserted into the corresponding positioning holes to fix the light-guiding strip.

The backlight module and the liquid crystal display device of the present invention, through disposing light-guiding strips for diffusing the incident light by the light source, can achieve higher luminance with less number of light sources. In addition, compared to the known direct-type and edge-type backlight modules, the cost of the present invention is lowered. Because the light-guiding strips have unique light-emitting surface, the incident light by the light source is diffused to become a planar light source; and then after the diffuser for further diffusion, the backlight module of the present invention provides higher luminance and uniformity.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
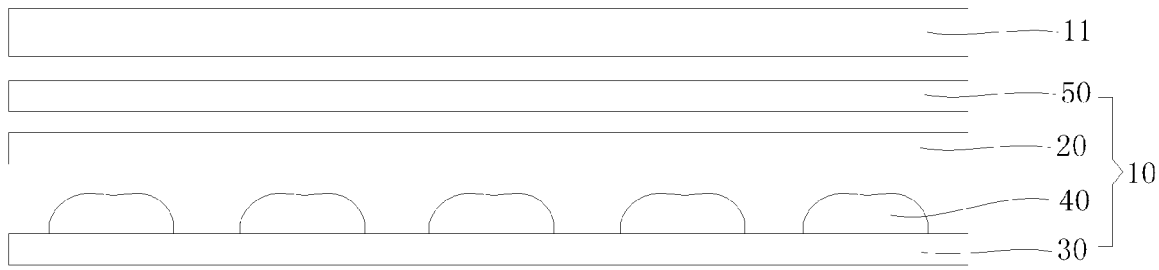
FIG. 1 is schematic view showing the structure of a liquid crystal display device according to an embodiment of the present invention.

The following describes the embodiments of the present invention in details. The embodiments are depicted in the drawings, wherein the same number indicates the same part. The following refers to the drawings and embodiments for detailed description of the present invention. In the following, to prevent the unnecessary details of commonly known structures and/or functions from cluttering the concept of the present invention, the details of commonly known structures and/or functions are omitted.

Figure 2:
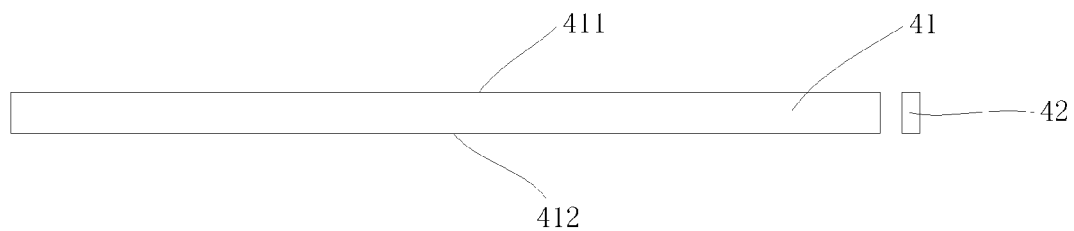
FIG. 2 is schematic view showing the structure of a light-emitting unit according to an embodiment of the present invention.

FIG. 1 is schematic view showing the structure of a liquid crystal display device according to an embodiment of the present invention; FIG. 2 is schematic view showing the structure of a light-emitting unit according to an embodiment of the present invention; and FIG. 3 is bottom view of FIG. 2.

Figure 3:
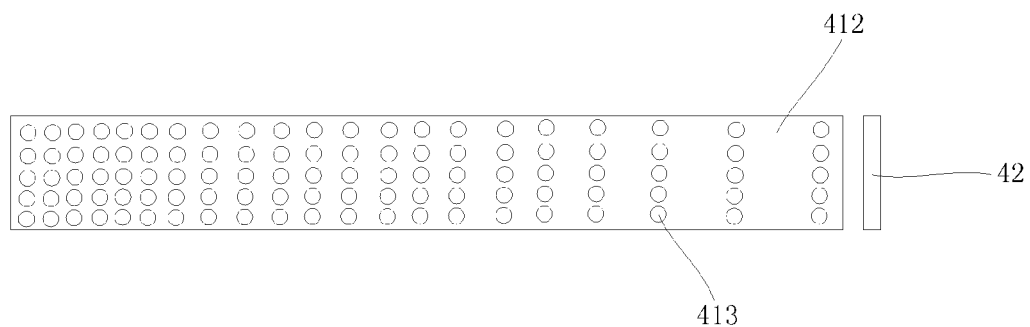
FIG. 3 is bottom view of FIG. 2.

As shown in FIGS. 1-3, the backlight module 10 of the instant embodiment is disposed opposite to a liquid crystal display panel 11, to further form a liquid crystal display device. The backlight module 10 provides displaying light to the liquid crystal display panel 11 so that the liquid crystal display panel 11 can display images. The backlight module 10 comprises a diffuser 20, a back plate 30 and a plurality of light-emitting units 40.

The diffuser 20 and the back plate 30 are disposed opposite to each other. The plurality of light-emitting units is disposed between the diffuser 20 and the back plate 30. The light-emitting unit comprises a light-guiding strip 41, fixed to the back plate 30 and light source 42, such as LED, fixed and disposed on the back plate 30 opposite to one end of the light-guiding strip 41. The light-guiding strip 41 has a strip structure, which comprises a light-emitting surface 411 and a bottom surface 412, disposed oppositely to each other. The light-emitting surface 411 has an arc cross-section and a top that is convex facing the bottom surface 412.

The incident light emitted by the light source 42 shines on surface at one end of the light-guiding strip 41, and is reflected and deflected internally inside the light-guiding strip 41. Then, the light-emitting surface 411 of the light-guiding strip 41 turns the incident light emitted by the light source 42 into a planar light source. The planar light source is emitted from the light-emitting surface 411. Then, through the deflection, reflection and scattering of the diffuser 20, the light emitted from the planar light source is diffused to become a planar light source with higher luminance and better uniformity.

In the instant embodiment, through disposing light-guiding strips 41 for diffusing the incident light by the light source 42, the backlight module can achieve higher luminance with less number of light sources 42. In addition, because the light-guiding strips 41 have unique light-emitting surface 411, the incident light by the light source 42 is diffused to become a planar light source; and then after the diffuser 20 for further diffusion, the backlight module of the present invention provides higher luminance and uniformity.

Furthermore, in the instant embodiment, a plurality of mesh dots 413 is disposed at the bottom surface 412 of the light-guiding strip 41 opposite to the back plate 30. The mesh dots 413 can be formed by printing or roller press. The mesh dots 413 are for changing the direction of incident light from the light source 42. The mesh dots 413 are distributed starting along the end of the light-guiding strip 41 near the light source 42 and the density gradually increases towards the other end of the light-guiding strip 41 away from the light source 42. When the incident light emitted by the light source 42 reaches the mesh dots 413 disposed on the bottom surface 412 of the light-guiding strip 41, the incident light is reflected by the mesh dots 413 to that the direction of the incident light is changed.

The distribution density of the mesh dots 413 is lower at the end bottom surface 412 of the light-guiding strip 41 close to the light source 42 and gradually increases towards the other end away from the light source 42. The reason is that the incident light emitted by the light source is brighter at the end close to the light source 42. Therefore, the number of mesh dots 413 can be less to reflect less on the incident light. On the other hand, the incident light emitted by the light source is less bright at the other end away from the light source 42. Therefore, the number of mesh dots 413 must be more to reflect more on the incident light. As such, even the light source 42 is disposed at one end of the light-guiding strip 41, the uniformity of the light along the entire length of the light-guiding strip 41 can be assured so that the overall luminance of the backlight module 10 is more uniform.

The following describes the light-emitting surface 411 of the light-guiding strip 41 in details.

Figure 4:
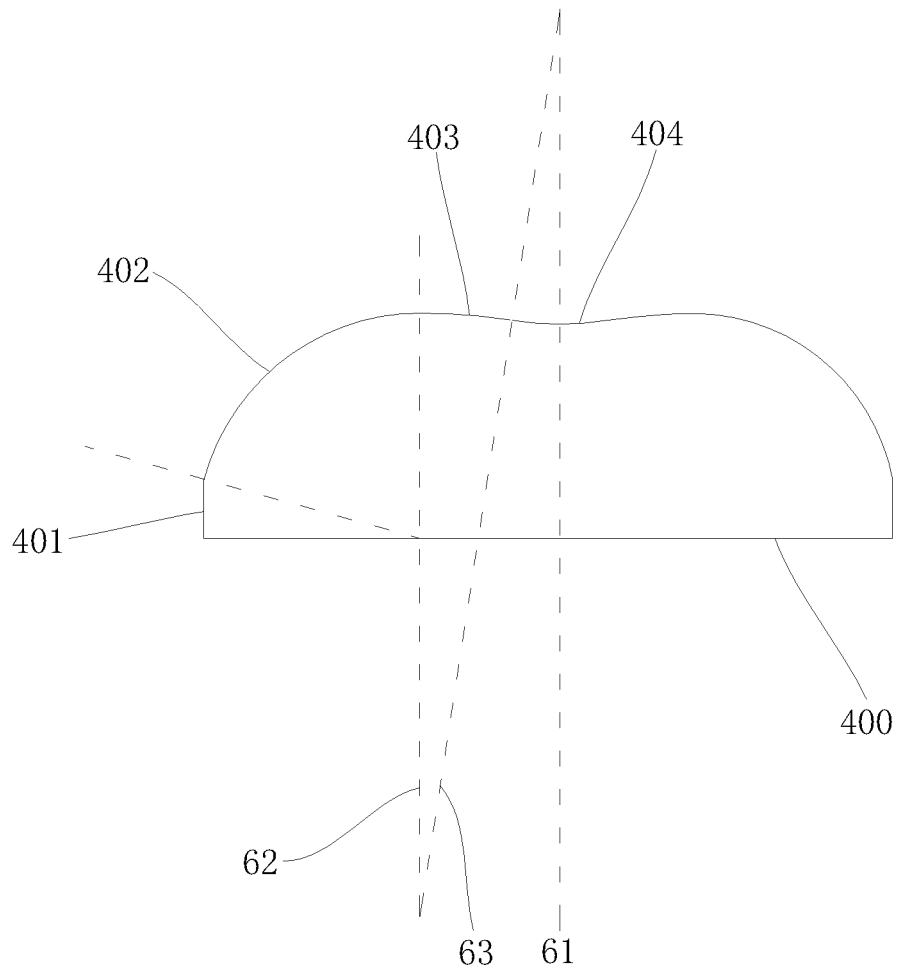
FIG. 4 is a schematic view showing the cross-section of a light-guiding strip according to an embodiment of the present invention.

FIG. 4 is a schematic view showing the cross-section of a light-guiding strip according to an embodiment of the present invention. Referring to FIG. 2 and FIG. 4, the light-guiding strip 41 of the instant embodiment has a cross-section symmetrical to an axis. The axis is the perpendicular bisector 61 of the bottom edge 400. Take the left side of the perpendicular bisector 61 as an example for explanation. The first segment 401, the second segment 402, the third segment 403 and the fourth segment 404 are connected in sequence and the transition between two adjacent segments is smooth. The first segment 401 is a straight line and perpendicular to the bottom edge 400. The second segment 402, the third segment 403 and the fourth segment 404 are smooth arcs. The second segment 402 is centered at the intersection point of a bottom edge 400 and a line 62 passing the intersection of the second segment 402 and the third segment 403, and perpendicular to the bottom edge 400. The radius of the segment 402 is the distance between the center and the intersection of the first segment 401 and the second segment 402. The second segment is convex facing away from the bottom edge 400. The fourth segment 404 is a concave arc. The fourth segment 404 is centered at the side of perpendicular bisector 61 away from the bottom edge 400 (i.e., the center is above the bottom edge 400). The third segment 403 is centered at the intersection of a line 63 connecting the intersection of the third segment 403 and the fourth segment 404 and the line 62. The third segment 403 is convex facing away the bottom edge 400. As shown, the third segment 403 and the fourth segment 404 have respective radius and center.

After the incident light emitted by the light source 42 enters and passes the light-guiding strip 41, the light-emitting surface 411 of the light-guiding strip 41 deflects so that the incident light diffuses towards two sides with the perpendicular bisector 61 as the axis to transform from a linear light source to a planar light source. The planar light source, after the diffusion of the diffuser 20, forms a planar light source with higher luminance and better uniformity.

Figure 5:
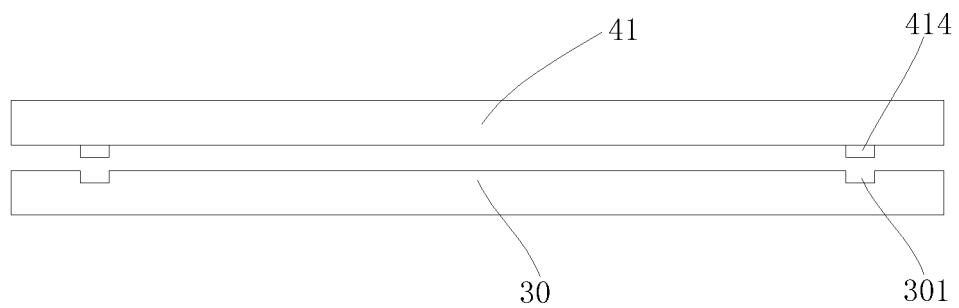
FIG. 5 is a schematic view showing a fixing structure of the light-guiding strip and the back plate according to an embodiment of the present invention.

FIG. 5 is a schematic view showing a fixing structure of the light-guiding strip and the back plate according to an embodiment of the present invention.

As shown in FIG. 5, for fixing the light-guiding strip 41 to the back plate 30, first positioning pegs 414 are disposed at the bottom surface 412 of the light-guiding strip 41 opposite to the back plate 30; and first positioning hole 301 are disposed on the back plate 30 correspondingly (corresponding to the location of the first positioning pegs 414). The first positioning pegs 414 are inserted into the corresponding first positioning holes 301 to fix the light-guiding strip 41 onto the back plate 30. In the present invention the number of the first positioning pegs 414 and the number of the first positioning holes 301 are not limited to the embodiment shown in FIG. 5.

Figure 6:
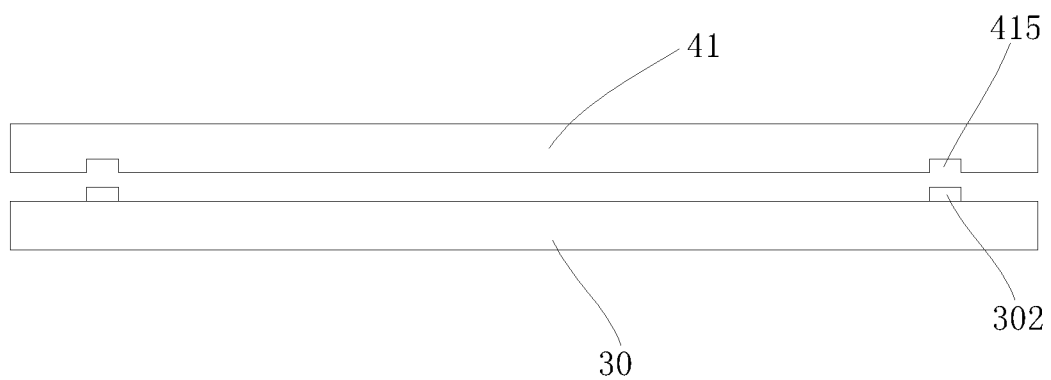
FIG. 6 is a schematic view showing another fixing structure of the light-guiding strip and the back plate according to another embodiment of the present invention.

FIG. 6 is a schematic view showing another fixing structure of the light-guiding strip and the back plate according to another embodiment of the present invention.

As shown in FIG. 6, the difference between the embodiment shown in FIG. 6 and the embodiment in FIG. 5 is that the disposition of positioning holes and positioning pegs is switched. Specifically, second positioning holes 415 are disposed at the bottom surface 412 of the light-guiding strip 41 opposite to the back plate 30; and second positioning pegs 302 are disposed on the back plate 30 correspondingly (corresponding to the location of the second positioning holes 415). The second positioning pegs 302 are inserted into the corresponding second positioning holes 415 to fix the light-guiding strip 41 onto the back plate 30. In the present invention the number of the second positioning holes 415 and the number of the second positioning pegs 3021 are not limited to the embodiment shown in FIG. 6.

In summary, through disposing light-guiding strips for diffusing the incident light by the light source, the present invention can achieve higher luminance with less number of light sources. In addition, compared to the known direct-type and edge-type backlight modules, the cost of the present invention is lowered. Because the light-guiding strips have unique light-emitting surface, the incident light by the light source is diffused to become a planar light source; and then after the diffuser for further diffusion, the backlight module of the present invention provides higher luminance and uniformity.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A backlight module, which comprises a back plate and a diffuser disposed opposite to the back plate; the backlight module further comprising a plurality of light-emitting units disposed between the back plate and the diffuser; each of the plurality of light-emitting units comprising an elongated light-guiding strip fixed to the back plate and a light source fixed and disposed on the back plate; the elongated light-guiding strip comprising a light-emitting surface, a bottom surface opposite to the light-emitting surface, and an end surface connecting the light-emitting surface with the bottom surface and being as a light-incident surface; the light source being disposed opposite to the end surface, the light-emitting surface having an arc cross-section and a top being convex facing the bottom surface; the light-emitting surface being for uniformly diffusing incident light from the light source;

wherein a cross-section of the elongated light-guiding strip is symmetrical with respect to the perpendicular bisector of a bottom edge of the cross-section, and in the cross-section of the elongated light-guiding strip, the light-emitting surface comprises a first segment, a second segment, a third segment and a fourth segment successively connected with one another in that order and disposed between the bottom edge and the perpendicular bisector; the first segment is a straight line connected with and perpendicular to the bottom edge; the second segment, the third segment and the fourth segment are smooth arcs; the second segment is convex facing away the bottom edge, the third segment is convex facing away the bottom edge, and the fourth segment is concave facing the bottom edge; a circle center of the second segment is located on the bottom edge, a circle center of the third segment and a circle center of the fourth segment both are distant from the cross-section and respectively are located at different sides of the cross-section.

2. The backlight module as claimed in claim 1, wherein the second segment is centered at the intersection point of the bottom edge and a first imaginary straight line passing the intersection of the second segment and the third segment and perpendicular to the bottom edge; the fourth segment is centered on the perpendicular bisector and at a top side of the cross-section; the third segment is centered at a bottom side of the cross-section and at the intersection of a second imaginary straight line and the first imaginary straight line, the second imaginary straight line comprising the intersection of the third segment and the fourth segment and the circle center of the fourth segment.

3. The backlight module as claimed in claim 2, wherein first positioning pegs are disposed at the bottom surface of the light-guiding strip opposite to the back plate; first positioning holes are disposed on the back plate correspondingly; and the first positioning pegs are inserted into the corresponding first positioning holes to fix the light-guiding strip.

4. The backlight module as claimed in claim 2, wherein second positioning holes are disposed at the bottom surface of the light-guiding strip opposite to the back plate; second positioning pegs are disposed on the back plate correspondingly; and the second positioning pegs are inserted into the corresponding second positioning holes to fix the light-guiding strip.

5. The backlight module as claimed in claim 1, wherein a plurality of mesh dots is disposed at the bottom surface of the light-guiding strip opposite to the back plate; the mesh dots are for changing the direction of incident light; the mesh dots are distributed starting along the end of the light-guiding strip opposite to the light source and the density gradually increases towards the other end of the light-guiding strip away from the light source.

6. The backlight module as claimed in claim 5, wherein first positioning pegs are disposed at the bottom surface of the light-guiding strip opposite to the back plate; first positioning holes are disposed on the back plate correspondingly; and the first positioning pegs are inserted into the corresponding first positioning holes to fix the light-guiding strip.

7. The backlight module as claimed in claim 5, wherein second positioning holes are disposed at the bottom surface of the light-guiding strip opposite to the back plate; second positioning pegs are disposed on the back plate correspondingly; and the second positioning pegs are inserted into the corresponding second positioning holes to fix the light-guiding strip.

8. The backlight module as claimed in claim 1, wherein first positioning pegs are disposed at the bottom surface of the light-guiding strip opposite to the back plate; first positioning holes are disposed on the back plate correspondingly; and the first positioning pegs are inserted into the corresponding first positioning holes to fix the light-guiding strip.

9. The backlight module as claimed in claim 1, wherein second positioning holes are disposed at the bottom surface of the light-guiding strip opposite to the back plate; second positioning pegs are disposed on the back plate correspondingly; and the second positioning pegs are inserted into the corresponding second positioning holes to fix the light-guiding strip.

10. A liquid crystal display device, which comprises: a backlight module and a liquid crystal display panel disposed opposite to each other, the backlight module providing displaying light source to the liquid crystal display panel for displaying images, wherein the backlight module further comprising: a back plate and a diffuser disposed opposite to the back plate; the backlight module further comprising a plurality of light-emitting units disposed between the back plate and the diffuser; each of the plurality of light-emitting units comprising an elongated light-guiding strip fixed to the back plate and a light source fixed and disposed on the back plate; the elongated light-guiding strip comprising a light-emitting surface, a bottom surface opposite to the light-emitting surface, and an end surface connecting the light-emitting surface with the bottom surface and being as a light-incident surface; the light source being disposed opposite to the end surface, the light-emitting surface having an arc cross-section and a top being convex facing the bottom surface; the light-emitting surface being for uniformly diffusing incident light from the light source;

wherein a cross-section of the elongated light-guiding strip is symmetrical with respect to the perpendicular bisector of a bottom edge of the cross-section, and in the cross-section of the elongated light-guiding strip, the light-emitting surface comprises a first segment, a second segment, a third segment and a fourth segment successively connected with one another in that order and disposed between the bottom edge and the perpendicular bisector; the first segment is a straight line connected with and perpendicular to the bottom edge; the second segment, the third segment and the fourth segment are smooth arcs; the second segment is convex facing away the bottom edge, the third segment is convex facing away the bottom edge, and the fourth segment is concave facing the bottom edge; a circle center of the second segment is located on the bottom edge, a circle center of the third segment and a circle center of the fourth segment both are distant from the cross-section and respectively are located at different sides of the cross-section.

11. The liquid crystal display device as claimed in claim 10, wherein the second segment is centered at the intersection point of the bottom edge and a first imaginary straight line passing the intersection of the second segment and the third segment and perpendicular to the bottom edge; the fourth segment is centered on the perpendicular bisector and at a top side of the cross-section; the third segment is centered at a bottom side of the cross-section and at the intersection of a second imaginary straight line and the first imaginary straight line, the second imaginary straight line comprising the intersection of the third segment and the fourth segment and the circle center of the fourth segment.

12. The liquid crystal display device as claimed in claim 11, wherein a plurality of mesh dots is disposed at the bottom surface of the light-guiding strip opposite to the back plate; the mesh dots are for changing the direction of incident light; the mesh dots are distributed starting along the end of the light-guiding strip opposite to the light source and the density gradually increases towards the other end of the light-guiding strip away from the light source.

13. The liquid crystal display device as claimed in claim 11, wherein second positioning holes are disposed at the bottom surface of the light-guiding strip opposite to the back plate; second positioning pegs are disposed on the back plate correspondingly; and the second positioning pegs are inserted into the corresponding second positioning holes to fix the light-guiding strip.

14. The liquid crystal display device as claimed in claim 10, wherein a plurality of mesh dots is disposed at the bottom surface of the light-guiding strip opposite to the back plate; the mesh dots are for changing the direction of incident light; the mesh dots are distributed starting along the end of the light-guiding strip opposite to the light source and the density gradually increases towards the other end of the light-guiding strip away from the light source.

15. The backlight module as claimed in claim 14, wherein second positioning holes are disposed at the bottom surface of the light-guiding strip opposite to the back plate; second positioning pegs are disposed on the back plate correspondingly; and the second positioning pegs are inserted into the corresponding second positioning holes to fix the light-guiding strip.

16. The liquid crystal display device as claimed in claim 10, wherein second positioning holes are disposed at the bottom surface of the light-guiding strip opposite to the back plate; second positioning pegs are disposed on the back plate correspondingly; and the second positioning pegs are inserted into the corresponding second positioning holes to fix the light-guiding strip.

* * * * *